(12) United States Patent
Wantling

(10) Patent No.: US 8,252,106 B2
(45) Date of Patent: Aug. 28, 2012

(54) MODIFIER FOR CONCRETE AND CEMENT FORMULATIONS AND METHODS OF PREPARING THE SAME

(75) Inventor: Steven J. Wantling, Hoover, AL (US)

(73) Assignee: Momentive Specialty Chemicals Inc., Columbus, OH (US)

( * ) Notice: Subject to any disclaimer, the term of this patent is extended or adjusted under 35 U.S.C. 154(b) by 497 days.

(21) Appl. No.: 12/406,840

(22) Filed: Mar. 18, 2009

(65) Prior Publication Data

US 2009/0235845 A1 Sep. 24, 2009

Related U.S. Application Data

(60) Provisional application No. 61/037,761, filed on Mar. 19, 2008.

(51) Int. Cl.
C04B 24/08 (2006.01)
C04B 38/00 (2006.01)

(52) U.S. Cl. .......................... 106/677; 106/660; 106/822

(58) Field of Classification Search .................. 106/660, 106/677, 822

See application file for complete search history.

(56) References Cited

U.S. PATENT DOCUMENTS

| | | |
|---|---|---|
| 1,814,292 A | 7/1931 | Chittick |
| 1,920,627 A | 8/1933 | Brassert |
| 2,432,963 A | 12/1947 | Camp |
| 2,803,555 A | 8/1957 | Clark, Jr. et al. |
| 2,839,811 A | 6/1958 | Benedict et al. |
| 3,171,335 A | 3/1965 | Pincon et al. |
| 3,189,469 A | 6/1965 | Littler et al. |
| 3,202,522 A | 8/1965 | Chi-Sun Yang et al. |
| 3,232,777 A | 2/1966 | Bush |
| 3,437,611 A | 4/1969 | Macklin |
| 3,563,786 A | 2/1971 | Tee at al. |
| 3,870,422 A | 3/1975 | Medico, Jr. |
| 4,153,743 A | 5/1979 | Caramanian |
| 4,207,115 A | 6/1980 | Boehme et al. |
| 4,656,005 A | 4/1987 | Arpin |
| 4,748,196 A | 5/1988 | Kuroda et al. |
| 5,085,708 A | 2/1992 | Moriya et al. |
| 5,173,117 A | 12/1992 | Inokawa et al. |
| 5,188,765 A | 2/1993 | Erhardt |
| 5,584,958 A | 12/1996 | Gillis et al. |
| 5,788,407 A | 8/1998 | Hwang |
| 6,010,596 A * | 1/2000 | Song .............................. 162/158 |
| 6,315,825 B1 | 11/2001 | Black |
| 6,585,820 B2 | 7/2003 | Wantling et al. |
| 6,652,643 B1 | 11/2003 | Black |
| 6,663,707 B2 | 12/2003 | Wantling et al. |
| 7,294,189 B2 * | 11/2007 | Wantling ................... 106/164.3 |
| 7,374,610 B2 | 5/2008 | Wantling |
| 7,473,712 B2 | 1/2009 | Wantling et al. |
| 7,473,713 B2 | 1/2009 | Wantling et al. |
| 7,563,826 B2 * | 7/2009 | Wantling et al. ................. 516/41 |
| 7,696,253 B2 | 4/2010 | Wantling et al. |
| 7,807,735 B2 * | 10/2010 | Wantling ........................ 524/45 |
| 2003/0061971 A1 | 4/2003 | Crook et al. |
| 2006/0100341 A1 | 5/2006 | Mosquet et al. |
| 2006/0243323 A1 * | 11/2006 | Wantling et al. ........... 137/87.01 |
| 2006/0283356 A1 * | 12/2006 | Donlon et al. ................. 106/660 |
| 2007/0181035 A1 | 8/2007 | Wantling et al. |
| 2009/0235844 A1 | 9/2009 | Wantling |
| 2009/0297818 A1 | 12/2009 | Williams et al. |

FOREIGN PATENT DOCUMENTS

| | | |
|---|---|---|
| JP | 6 180002 A | 6/1994 |
| JP | 2 968868 B | 11/1999 |
| JP | 2001 233662 A | 8/2001 |
| JP | 2005344433 | 6/2004 |
| JP | 2008 008125 A | 1/2008 |
| WO | WO 95/35145 A1 | 12/1995 |
| WO | WO 01/40134 | 6/2001 |
| WO | WO 01/40134 A1 | 6/2001 |
| WO | WO 2005/039841 | 5/2005 |

* cited by examiner

*Primary Examiner* — David M Brunsman

(57) ABSTRACT

Disclosed are wax emulsion modifiers for concrete and cement formulations and methods for preparing same. The modifiers are applicable to pervious concrete, used in residential areas, parking lots and parks to more effectively manage storm waters and improve environmental practices. This invention also relates to conventional Portland cement concrete mix designs with little to no sand, which provide improved workability, low hydration rates without sacrificing strength while achieving high levels of porosity for water transmission.

18 Claims, No Drawings

MODIFIER FOR CONCRETE AND CEMENT FORMULATIONS AND METHODS OF PREPARING THE SAME

RELATED APPLICATION DATA

This application claims the benefit of U.S. Provisional Application Ser. No. 61/037,761 filed Mar. 19, 2008, the entire contents of which are hereby incorporated by reference.

FIELD OF THE INVENTION

The present invention relates to wax emulsion modifiers for concrete and cement formulations and to methods for preparing same. The modifiers are applicable to pervious concrete, used in residential areas, parking lots and parks to more effectively manage storm waters and improve environmental practices. This invention also relates to conventional Portland cement concrete mix designs with little to no sand, which provide improved workability, low hydration rates without sacrificing strength while achieving high levels of porosity for water transmission.

BACKGROUND OF THE INVENTION

Pervious concrete is concrete, but it is unique in the sense that is designed to achieve high levels of porosity desired to implement best practices for storm water management. It requires a drier or stiffer consistency. Pervious concrete can have a much broader range of material properties than conventionally placed concrete, especially in instances where additives are used in the mix to control rheology, water hydration levels and overall curing rates.

By definition, pervious concrete is concrete comprising a mixture of cement, large narrow distribution aggregate, little to no sand, and water, having a consistency of a paste allowing it to be compacted with manual or vibratory screeds and typically finished with steel pipe rollers. Pervious concrete can at times incorporate supplemental cementitious materials such as fumed silica, fly ash or blast furnace slag to insure long term performance. It is usually mixed in batches, delivered in trucks with capabilities for quick discharge at the site, and must be finished typically within 1.5 hours from its original batch preparation.

Pervious concrete has generally been used for applications such as parking lots, sidewalks, parks and low volume residential road construction, requiring usually a few inches of crushed gravel bed sub-layer as an essential element to enhance the strength, durability and overall water storage and removal capability.

Conventional poured mass concrete is designed to have the highest fluidity by use of water and additives, the pervious concrete formulations have the same ingredients as conventional concrete, i.e., cement, water, and aggregates, but unlike conventional concrete it is a drier mix, in fact stiff enough to require different techniques to manage application at the job site. Pervious concrete cannot be effectively pumped because of its stiffness and high viscosity and thus ample access to the job site for quick discharge cement trucks is required. Since the success of pervious concrete depends on being able to achieve the proper balance of strength and porosity, the level of pressure applied during the compaction can be achieved with vibratory, laser controlled or manual screeds and finished with steel pipe rollers. To achieve the desired compressive strength, fine mist water spraying and plastic sheeting over the concrete is the usual method for curing this concrete.

Current pervious concrete mix can be optimized by adjusting water content and the use of additives such as retardants, hydration stabilizers and rheology modifiers to achieve the best compromise between the full cure properties, void fraction % and workability of the concrete during the application and finishing.

Surfactants decrease the need for excess water, while making the concrete mix pourable as if the added amount of excess water was present. When surfactants are introduced into the concrete, the result is a less porous and somewhat stronger product. The strength increase is attributed to lower water/cement ratio and decrease in porosity.

Attempts have been made to develop mix designs noted as LCE (Low Compactive Effort) to offset normally employed compaction which disrupts the formation of open void structures because of the compressive forces employed to gain the needed design strength. One initial shortfall in the use of LCE mix designs is that they produce lower strength to void ratios, and may therefore only marginally meet the design parameters of the placement. Attempts have been made to affect this shortfall in design performance by incorporating one or more chemical modifiers identified in the trade as High Range Water Reducers, Viscosity/Rheology Modifiers, and Mix Retarders. While a gain in initial strength can be demonstrated by such additives, there is a corresponding lose in permeability which falls below the acceptable design limit.

The prior art provides for compositions, and a process for improving the early strength of cement aggregate products, in a stabilized aqueous emulsion with a surfactant such as alkali metal salts of fatty acids, alkali metal salts of sulfated fatty acids, alkali metal alkyl sulfates, alkali metal alkyl sulfonates, alkali metal aryl sulfonates, alkali metal alkyl lauryl sulfonate, alkali metal salts of alkylated naphthalene, alkali metal salts of lignosulfonic acid, condensation products of ethylene oxide and polyalkylene glycols, fatty acid glycerides, fatty acid amides, polyethylene sorbitol esters of fatty acids, quarternary ammonium halides, sorbitan esters, sulfonated or sulfated fatty acid esters or amides, and sulfonic acid.

The prior art indicates that the introduction of a wax into the composition of water, cement, and aggregate used to produce other concrete products like pervious concrete caused the resulting concrete to have substantially less strength than the concrete product produced from a substantially identical composition without the wax. It is believed that the wax coated the aggregate particles and inhibited the adherence of the cement paste to the aggregate causing the weakening as measured by testing the compressive strength. Therefore, the use of waxes in cement formulations for pervious concrete application is not advisable.

SUMMARY OF THE INVENTION

In one embodiment, the present invention provides an aqueous emulsion, useful for providing a cementitious composition with a field strength of greater than 2000 psi and greater than 20% voids, which includes a paraffin hydrocarbon wax, a saponifiable wax, a saponifier, and an optional dispersant.

In another embodiment, the present invention provides an aqueous emulsion, useful for providing a cementitious composition with a field strength of greater than 2000 psi and greater than 20% voids, which includes essentially only a paraffin hydrocarbon wax, a saponifiable wax, a saponifier, and an optional dispersant.

In another embodiment, the present invention provides a method for preparing an aqueous emulsion, that provides cementitious compositions a field strength of greater than 2000 psi and greater than 20% voids, which includes the steps of combining water, a paraffin hydrocarbon wax, a saponifiable wax and a saponifier, heating the combination to a temperature of between about 185° F. (85° C.) to about 205° F. (96.1° C.), then homogenizing the mixture.

In another embodiment, the present invention provides for a pervious cementitious composition, including dry cement, admixed with about 1 to about 25 gallons per cubic yard of an aqueous emulsion which includes a paraffin hydrocarbon wax, a saponifiable wax, a saponifier, and an optional dispersant.

DETAILED DESCRIPTION OF THE INVENTION

It has been found that the aqueous emulsion modifiers of the invention, which include a paraffin wax, a saponifiable wax, a saponifier, and optionally a dispersing agent, when admixed into concrete design mixes, provides for improved properties and advantages including an initial compressive strength of up to 2000 psi while obtaining void fraction levels of greater than 20%. An additional advantage is the lack of seal over (migration of cement past the bottom of the placement sealing, preventing flow through the slab) in the design mixes of the invention.

In one embodiment the paraffin hydrocarbon wax has a melting point in the range of about 50° C. to about 70° C. In another embodiment the paraffin wax contains one or more $C_nH_{2n+2}$ hydrocarbons, where n is an integer between 18 and 42. The paraffin wax may comprise about 20 to about 60 wt % of the emulsion. In another embodiment, the paraffin wax may comprise about 30 to about 50 wt % of the emulsion.

In one embodiment, the second wax is a Montan wax, also known as lignite wax, having a melting point in the range of 70° C. to 100° C. and an acid value greater than 25, and a saponification number greater than 85. The second wax may also be from a class of waxes characterized in that it has both an acid value and a saponification value, for example, carnauba wax, candelilla wax, bayberry-myrtle wax, Japan wax, and the like. The second wax may also be a combination or any subset of such saponifiable waxes. In one embodiment, the second wax is present in the emulsion is between about 0.01 to about 20 parts, by weight, per 100 parts of the paraffin wax. The parts by weight of the second wax correspond to the second wax comprising between about 0.002 wt % to about 12 wt % of the emulsion. In another embodiment, the second wax is present in an amount of between about 0.01 to about 10 parts, by weight, per 100 parts of the paraffin wax, corresponding to between about 0.002 wt % to about 6 wt % of the emulsion. In another embodiment, the second wax is present in an amount of between about 0.5 to about 7 parts, by weight, per 100 parts of the paraffin wax, corresponding to between about 0.1 wt % to about 4.2 wt % of the emulsion. In another embodiment, the second wax is present in an amount of between about 0.02 to about 5 parts, by weight, per 100 parts of the paraffin wax, corresponding to between about 0.004 wt % to about 3 wt % of the emulsion.

Saponification of such waxes, as is known in the art, may be accomplished by combining the wax with a strongly basic material such as an ammonia hydroxide or an alkali metal hydroxide such as potassium hydroxide, sodium hydroxide or lithium hydroxide. The amount of saponifier needed may be calculated based on the saponification value of the wax. For one example, the saponification value divided by 1000 equals the grams of potassium hydroxide to add per gram of wax. For Montan wax, at least 0.1 part, corresponding to at least 0.0002 wt % (or at least 1.2 wt %) of the emulsion, potassium hydroxide, by weight, or less than 1 part by weight, corresponding to less than 12 wt % (or less than 0.002 wt %) of the emulsion, sodium hydroxide, or more than 0.1 part by weight, corresponding to more than 0.0002 wt % (or more than 1.2 wt %) of the emulsion, ammonium hydroxide is required per part of Montan wax. The actual amount of the alkali metal or ammonium hydroxide required can be readily determined by those skilled in the art.

In certain embodiments of the present invention a dispersing aid, or fluidity modifier, may be useful. Such dispersing agents are strong lipophiles, which are, consequently, good defoamers. One such dispersing agent is poly(oxy-1,2-ethanedyl), alpha-phenyl-omega-hydroxy styrenate. A salt of polynaphthalenesulfonic acid may also be utilized as a dispersant/surfactant. The salt may be produced by the reaction of polynaphthalenesulfonic acid and a saponifier. One commercially available polynaphthalenesulfonic acid is DISAL GPS, which may be obtained from Handy Chemical, Montreal, Quebec, Canada. DURASAR Polynaphthalene sulfonate calcium salts, also available from Handy Chemical, Montreal, Quebec, Canada, may also be used as dispersing agent. In one embodiment, the dispersant/surfactant may comprise about 0.1 to about 5 wt % of the emulsion. In another embodiment the dispersant/surfactant may comprise about 0.25 to about 5 wt % of the emulsion.

In one embodiment, the ratio between the dry blend cement and the emulsion of the invention is between about 1 to about 25 gallons per cubic yard of mix (about 3.8 to about 94.6 liters per cubic meters of mix). In another embodiment, the ratio between the dry blend cement and the emulsion of the invention is between about 1 to about 7 gallons per cubic yard of mix (about 3.8 to about 26.6 liters per cubic meters of mix). When blended with cement, aggregates and sand, the emulsion of the invention provides an initial compressive strength of at least 2400 psi which increases further with curing to the design strength, which is typically at least about 5000 psi.

In one embodiment, the wax emulsion modifier of the invention is admixed with a cementitious composition, typically Portland cement and class 1 fly ash. In another embodiment, the wax emulsion modifier of the invention is not applied to the surface of a cementitious composition.

It has been found that both the desired strength requirements and the desired permeability requirements, as a ratio one to the other, can be affected without the use of the chemical modifiers described in the prior art, by incorporating the aqueous emulsion modifier of the invention into the cement, aggregate, water mix design. Admixing the emulsion modifiers of the invention provides for improved properties and advantages such as the cement paste becoming both adhesive to the aggregate, and cohesive to the adjoining structures.

In one embodiment mix designs of the present application are free of any one or more chemical modifiers or admixtures known in the art as High Range Water Reducers, Viscosity/Rheology Modifiers or Mix Retarders. In another embodiment, mix designs of the invention replace any one or all of High Range Water Reducers, Viscosity/Rheology Modifiers, and Mix Retarders.

It has been further demonstrated that when incorporating the described emulsion, that it is possible to eliminate a like quantity of cement without negatively affecting the design requirements. A further advantage has been found in that the surface finish is more uniform and structurally smooth, when incorporating the described emulsion which translates to less finishing work needed for a specific placement. A side benefit occurs where for every pound of cement eliminated from a mix design there is an offsetting credit for Carbon Dioxide (LEEDS Credits) associated with the production of cement.

In one embodiment, in mix designs, a wt % of cement is replaced with the emulsion of the invention in a ration of 1:1. In one y 205° F. (96.1° C.). The aqueous and wax mixtures where then combined and the resultant mixture was then placed in a homogenizer. With homogenization it is preferred that a distribution of micelle diameters ranging from about 0.6 micron to about 1.8 micron be achieved. However, the distribution of micelle diameters may range from about 0.5 micron to about 2.5 micron. This level of homogenization may be attained, for example, by using a dual orifice homogenizer operating at from about 2,000 to about 4,000 psig.

TABLE 1

Modifier Formulation

| Component | Weight Percent (wt %) |
| --- | --- |
| Paraffin Wax | 38.68 |
| Montan Wax | 1.00 |
| DISAL[1] Dispersant | 1.00 |
| 45% aq. KOH | 0.25 |
| Water | 59.07 |

[1]DISAL is a polynaphthalenesulfonic acid dispersant available from Handy Chemical, Montreal, Quebec, Canada.

Table 2 sets forth the components of a comparative mix design without the wax emulsion modifier of the invention and an LCE mix design, with admixtures, standard to the industry.

TABLE 2

Comparative Mix Designs for 1 Cubic Yard

| Material | Control 1 | Control 2 (LCE) |
| --- | --- | --- |
| Cement | 611 lbs | 581 lbs |
| Water | 183 lbs | 163 lbs |
| Coarse Aggregate, #57 | 2550 lbs | 2338 lbs |
| High Range Water Reducer | na | 5 oz/cwt |
| Viscosity Modifier | na | 2 oz/cwt |
| Retarder | na | 3 oz/cwt |

When the emulsions of the invention are used, the quantity of water contained in the emulsion is deducted from the initial water quantity from the composition without emulsion. Mixing was continued for approximately 5 minutes until the mixture was uniform in consistency and hydration had occurred noted by a visual change in the consistency of the mix.

Tables 3 and 4 summarizes the trial batches including varying % cement replacement and admixture replacement in control Mixes 1 and 2 with the emulsion of the invention, then comparing plastic and hardened properties. 4×8 cylinder molds were cast to determine strength (ASTM C1176) and voids of the mixtures as is well known in the art.

TABLE 3

| Mix Design | Test Batch 1 | Test Batch 2 | Test Batch 3 |
| --- | --- | --- | --- |
| Control 1 | 1290 psi | 1515 psi | 545 psi 24.8% voids |
| Example 1: Control 1 with 5% replacement of cement with emulsion of the invention | 1490 psi | 1470 psi | 650 psi 27.7% voids |

TABLE 4

| Mix Design | Test Batch 4 | Test Batch 5 | Test Batch 6 |
| --- | --- | --- | --- |
| Control 2 (LCE) | 2200 psi less permeable | 2445 psi 27.5% voids | 1493 psi 34.4% voids |
| Example 2: Control 2 with HRWR[2] and Retarder replaced with emulsion of the invention | 1660 psi | 2270 psi, 26.9% voids | 1325 psi 28.1% voids |
| Example 3: Control 2 with HRWR[2], Viscosity Modifier and Retarder replace with emulsion of the invention | 1380 psi, more permeable | 1995 psi 26.5% voids | na |
| Example 4: Control 2 with HRWR[2], Viscosity Modifier and Retarder replace with emulsion of the invention | na | na | 1550 psi |

[2]HRWR is High Range Water Reducer

Example 5

An 8 cubic yard LCE mixture was placed and compared to an 8 cubic yard LCE mixture with the emulsion of the invention replacing on all three admixtures and 5% cement. The LCE pad that was used as the control averaged at 3295 psi but only had a void % of 15%. The LCE mix modified with the emulsion of the invention had an average strength of 2075 psi with a void % of 22.3%. In the industry, it is important to balance strength with void content. The industry recommends against less than 2000 psi field strength or less than 20% voids. The standard LCE mix fails to meet void % which does not allow for enough storage of most rain events.

As demonstrated above, replacing a wt % of cement with the emulsion of the invention produces pervious concrete that is strong, permeable and easy to work with in the field without chemical admixture, which lends to environmental stewardship of producers as well as LEED credit for projects.

While the present invention has been described and illustrated by reference to particular embodiments and examples, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A method for preparing an aqueous emulsion, for providing a pervious cementitious composition with a field strength of greater than 2000 psi and greater than 20% voids, the method comprising:
   combining water, a paraffin hydrocarbon wax, a saponifiable wax, a dispersant, and a saponifier;
   heating the combination to a temperature of between about 185° F. (85° C.) to about 205° F. (96.1° C.);
   homogenizing the mixture; and then
   blending the mixture with at least cement.

2. The method of claim 1, wherein the mixture is homogenized with cement and aggregate.

3. The method of claim 1, wherein the aqueous emulsion consists essentially of:
   (a) a paraffin hydrocarbon wax,
   (b) a saponifiable wax,
   (c) a saponifier, (d) a dispersant, and
(e) water.

4. The method of claim 1, wherein the cement comprises a mixture of Portland cement and class 1 fly ash.

5. The method of claim 1, wherein:
the paraffin hydrocarbon wax has a melting point between about 50° C. to about 70° C., and
the saponifiable wax comprises a Montan wax having a melting point in the range of between about 70° C. to about 100° C., an acid number greater than 25, and a saponification number of greater than 85.

6. The method of claim 1, wherein the saponifier comprises ammonia hydroxide or an alkali metal hydroxide.

7. The method of claim 1, wherein the dispersant comprises polynaphthalenesulfonic acid in an amount of about 0.1 to about 5 wt % based upon the weight of the emulsion.

8. The method of claim 1, wherein the Montan wax is present in an amount of about 0.01 to about 10 parts, by weight, per 100 parts of the paraffin hydrocarbon wax.

9. A pervious concrete composition comprising:
an aqueous emulsion comprising:
a paraffin hydrocarbon wax;
a saponifiable wax;
a saponifier; and
a dispersant; and
dry cement; and
aggregate, wherein the pervious concrete composition has a field strength of greater than 2000 psi and greater than 20% voids.

10. The pervious concrete composition of claim 9 wherein the composition is free of high range water reducers, viscosity/rheology modifiers or mix retarders.

11. The pervious concrete composition of claim 9 wherein the composition exhibits an alkalinity comparable to that of a Portland cement concrete mix and wherein the emulsion mixes without separation.

12. The pervious concrete composition of claim 9, wherein the aqueous emulsion consists essentially of:
(a) a paraffin hydrocarbon wax,
(b) a saponifiable wax,
(c) a saponifier,
(d) a dispersant, and
(e) water.

13. The pervious concrete composition of claim 12, wherein the aqueous emulsion consists essentially of:
about 38.68 wt % of paraffin wax;
about 1 wt % on Montan wax;
about 1 wt % of polynapthalenesulfonic acid dispersant;
about 0.25 wt % of 45% aqueous potassium hydroxide; and
about 59.07 wt % water.

14. The pervious concrete composition of claim 9, wherein the dry cement comprises a mixture of Portland cement and class 1 fly ash.

15. The pervious concrete composition of claim 9, wherein:
the paraffin hydrocarbon wax has a melting point between about 50° C. to about 70° C., and
the saponifiable wax comprises a Montan wax having a melting point in the range of between about 70° C. to about 100° C., an acid number greater than 25, and a saponification number of greater than 85.

16. The pervious concrete composition of claim 9, wherein the saponifier comprises ammonia hydroxide or an alkali metal hydroxide.

17. The pervious concrete composition of claim 9, wherein the dispersant comprises polynaphthalenesulfonic acid in an amount of about 0.1 to about 5 wt % based upon the weight of the emulsion.

18. The pervious concrete composition of claim 9, wherein the Montan wax is present in an amount of about 0.01 to about 10 parts, by weight, per 100 parts of the paraffin hydrocarbon wax.

* * * * *